Nov. 17, 1964 D. H. LIEN 3,157,866

RING-TYPE MAGNETIC MEMORY ELEMENT

Filed Oct. 25, 1961

INVENTOR
D. H. LIEN
BY A. C. Schwarz, Jr.
ATTORNEY

United States Patent Office 3,157,866 Patented Nov. 17, 1964

3,157,866

RING-TYPE MAGNETIC MEMORY ELEMENT

Dallas H. Lien, Indianapolis, Ind., assignor to Western Electric Company, Incorporated, New York, N.Y., a corporation of New York Filed Oct. 25, 1961, Ser. No. 147,566
4 Claims. (Cl. 340—174)

This invention relates to a ring-type magnetic memory element and more specifically to a magnetic memory element from which a stored data signal may be read out without the stored data signal being altered.

The present patent is the parent of my co-pending divisional application Serial No. 383,044, filed July 16, 1964.

An object of this invention is to provide a new and improved magnetic memory element of the designated nature.

Another object of this invention is to provide a new and improved ring-type magnetic memory element wherein a data signal may be stored by a relatively high intensity storing signal and the data signal may be read out by a relatively low intensity read out signal without the stored data signal being altered.

An additional object of this invention is to provide a new and improved ring-type magnetic memory element wherein a data signal may be stored by a storing signal having a relatively long pulsing period and the data signal may be read out by a read out signal having a relatively short pulsing period without the stored data signal being altered.

With these and other objects in mind, the present invention relates to a ring-type magnetic memory element wherein a data signal may be stored and from which the data signal may be read out without the stored data signal being altered so that subsequently the stored data signal may be read out again. The memory element includes a ring having two magnetic sections with minimum and maximum cross sectional regions and the ring has input and output windings wound thereabout.

One of the magnetic sections is composed of a highly retentive magnetic material which has a high reluctance and a high coercive force so that a data signal may be stored therein by inducing a relatively high intensity flux change representative of the data signal in the ring which drives the retentive section to a state of magnetization representative of the data signal. The other magnetic section is composed of a nonretentive material having a low reluctance and a high permeability.

The magnetic sections are so designed and arranged that, when the retentive section has attained a state of magnetization, a flux proportional to the state of magnetization of the retentive section is forced into the nonretentive section. The flux forced into the nonretentive section concentrates in the minimum cross sectional region thereof and the amount of flux present therein remains constant, as long as the retentive section is maintained at the same state of magnetization, so that in essence the flux is residual flux.

A current pulse representative of the stored data signal may be induced in the output winding by inducing a relatively low intensity flux change in the ring which has sufficient amplitude to saturate only the minimum cross sectional region of the nonretentive section without affecting the retentive section.

Other objects and advantages of the invention will become apparent by reference to the following detailed description and the accompanying drawings illustrating preferred embodiments thereof, in which.

Figures 1, 2, 3, 4:
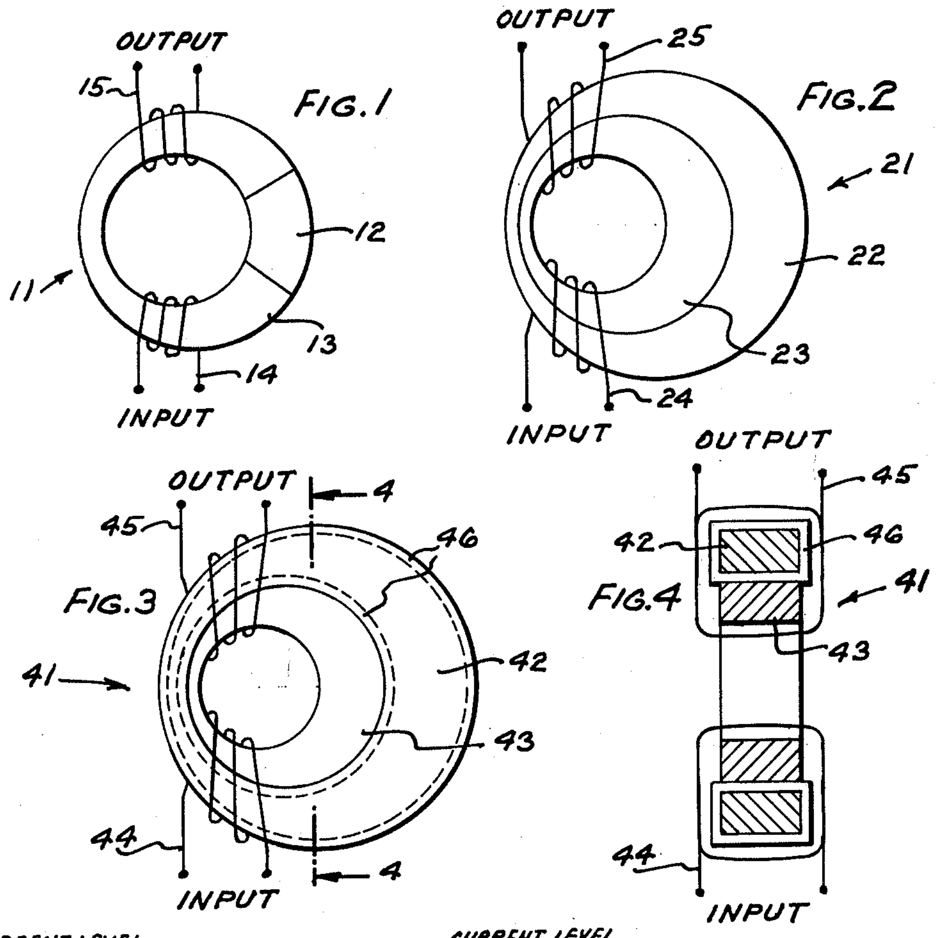
FIG. 1 is an enlarged view of a ring-type magnetic memory element illustrating a first embodiment thereof.
FIG. 2 is an enlarged view of a ring-type magnetic memory element illustrating a second embodiment thereof.
FIG. 3 is an enlarged view of a ring-type magnetic memory element illustrating a third embodiment thereof.
FIG. 4 is a cross sectional view of FIG. 3 taken along line 4—4 illustrating the relationship of the elements included therein.

Three embodiments of the invention are illustrated in FIGS. 1, 2, and 3. In each embodiment, a ring-type magnetic memory element is provided wherein a data signal having an amplitude within predetermined limits may be stored and from which the data signal may be read out without the stored data signal being altered.

*First and Second Embodiments of the Memory Element*

The first embodiment forms the subject matter of my aforementioned divisional application. The memory element 11 in FIG. 1 consists of a single ring which (1) has an eccentric aperture formed therein so that a maximum cross sectional region and a minimum cross sectional region are provided, (2) has two magnetic sections 12 and 13 which have different magnetic characteristics, and (3) has input and output windings 14 and 15 wound thereon.

The magnetic section 12 is composed of a highly retentive, "hard" material which has a high reluctance and a high coercive force so that a data signal may be stored therein, and the retentive section 12 includes the maximum cross sectional region of the ring. Materials, such as iron oxide or Alnico, are used to manufacture the retentive section 12 and preferably this section is sintered or has holes formed therein so that a high reluctance path is provided. Since the retentive section 12 is composed of a high reluctance material, a high intensity current pulse must be applied about the memory element 11 in order for a flux change to be induced in the retentive section 12.

The other magnetic section 13 is composed of a nonretentive, "soft" material which has a low reluctance and a high permeability, and the nonretentive section 13 includes the minimum cross sectional region of the ring. Materials, such as ferrite or laminated Permalloy, are used to manufacture the nonretentive section 13 and, with these materials, eddy current losses in the nonretentive section are maintained at a minimum. Since the nonretentive section 13 is composed of a low reluctance material, a flux change may be induced therein by applying a low intensity current pulse about the memory element 11.

As illustrated, the retentive section 12 includes the maximum cross sectional region of the memory ring 11 and the nonretentive section 13 includes the minimum cross sectional region of the memory ring 11. However, the memory ring 11 will also meet the prescribed requirements if the retentive section 12 does not have a wider maximum cross sectional region than the nonretentive section 13 or if the nonretentive section 13 does not have a narrower minimum cross sectional region than the retentive section 12.

The magnetic sections 12 and 13 are so arranged that, when the retentive section 12 attains a state of magnetization, flux is forced into the nonretentive section 13 from the retentive section 12, since the nonretentive section provides a flux path from one end of the retentive section to the other end which is less reluctive than the surrounding air. In essence, the two ends of the retentive section 12 are like the two poles of a magnet and flux tends to flow from one end to the other in proportion to the state of magnetization thereof. The flux forced into the nonretentive section 13 is proportional to the state of magnetization of the retentive section 12 and the flux concentrates in the minimum cross sectional region of the nonretentive section. The amount of flux present in the nonretentive section 13 remains constant, as long as the retentive section 12 is maintained at the same state of magnetization, so that in essence the flux is residual flux.

The memory element 21 in FIG. 2 consists of an outer magnetic memory ring 22 and an inner magnetic memory ring 23 and has input and output windings 24 and 25 wound about the memory rings 22 and 23.

The outer memory ring 22 has an eccentric aperture formed therein so that maximum and minimum cross sectional regions are provided and is composed of a highly retentive, "hard" magnetic material identical to the material used for the retentive section 12 of the memory element 11 (FIG. 1), as set forth hereinabove, so that a data signal may be stored therein.

The inner memory ring 23 conforms in shape to the aperture formed in the outer memory ring 22 and is positioned within the aperture of the outer memory ring 22. Also, the inner memory ring 23 has an eccentric aperture formed therein so that maximum and minimum cross sectional regions are provided, and is composed of a nonretentive, "soft" magnetic material identical to the material used for the nonretentive section 13 of the memory element 11 (FIG. 1), also set forth hereinabove.

The memory rings 22 and 23 are so designed that the circular aperture of the nonretentive, inner memory ring 23 is eccentric with respect to the retentive, outer memory ring 22, though the memory rings 22 and 23 may be arranged so that a concentric relationship is provided. The memory element 21 will also meet the prescribed requirements if the retentive memory ring 22 is designed to be the inner memory ring.

When the retentive memory ring 22 attains a state of magnetization, the flux present therein flows through a continuous closed path. As flux flowing therein approaches the minimum cross sectional region, some flux leaves the retentive memory ring 22 and flows through a portion of the nonretentive memory ring 23 since the nonretentive memory ring 23 provides a less reluctive flux path. In essence, the flux flowing through the nonretentive memory ring 23 is forced out of the retentive memory ring 22. The flux forced out of retentive memory ring 22 flows through the nonretentive memory ring 23 rather than the surrounding air since the flux path therethrough is less reluctive than the surrounding air, and the amount of flux entering the nonretentive memory ring 23 is a function of the state of magnetization of the retentive memory ring 22. Additional flux is induced in the nonretentive memory ring 23 by the flux flowing therethrough, which acts as a magnetizing force so that a "spreading" of magnetism is provided.

The flux forced into the nonretentive memory ring 23 and the induced flux concentrate in the minimum cross sectional region thereof and the amount of flux present therein remains constant, as long as the retentive memory ring 22 is maintained at the same state of magnetization, so that in essence the flux is residual flux.

The state of magnetization of the retentive section of the memory element 11 and the retentive ring of the memory element 21 may be altered by applying new, relatively high intensity current pulses to the input windings 14 and 24 and stored data signals may be erased by applying decaying amplitude A.C. signals to the input windings 14 and 24.

Figure 5:
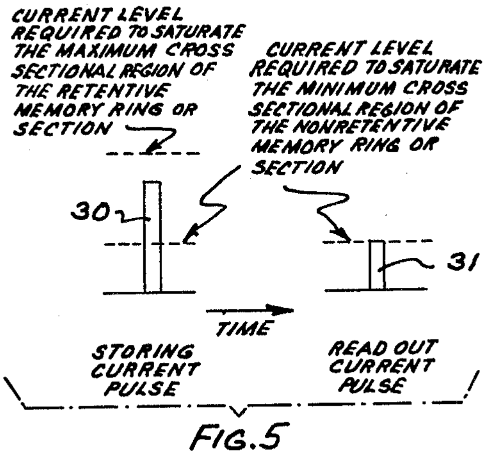
FIG. 5 illustrates typical input current pulses to be applied to the input windings of the memory elements illustrated in FIGS. 1 and 2 for storing and reading out data signals.

In order to store a data signal in the memory elements 11 and 21 illustrated in FIGS. 1 and 2 or to read out a stored data signal therefrom, current pulses similar to the pulses illustrated in FIG. 5 are applied to the input windings 14 and 24 thereof. Since the principles of operation for storing data signals in the memory elements 11 and 21 and for reading out data signals therefrom are similar, the operations are set forth below for the memory element 21 only.

The storing current pulse 30 (FIG. 5) must have sufficient intensity to induce a flux change in the retentive memory ring 22 of the memory element 21. Therefore, the storing current pulse must have an amplitude greater than that required to induce a flux change in the nonretentive memory ring 23 of sufficient amplitude to saturate the minimum cross sectional region thereof, but must have an amplitude less than that required to induce a flux change in the retentive memory ring 22 of sufficient amplitude to saturate the maximum cross sectional region thereof.

Thus, a data signal may be stored by applying a relatively high intensity current pulse, representative of the data signal, to the input winding 24 which has an amplitude that falls between predetermined limits and which causes the retentive memory ring 22 to be driven to a state of magnetization representative of the data signal. A flux change is also induced in the nonretentive memory ring 23 when the storing current pulse is applied to the input winding 24, but the flux change induced therein has no permanent effect thereon because of the nonretentive characteristics thereof.

The read out current pulse 31 (FIG. 5) must be a relatively low intensity current pulse which has no effect on the retentive memory ring 22, because of its magnetic characteristics, so that the stored data signal is not altered during read out. Therefore, the read out current pulse must have an amplitude which corresponds to that required to induce a flux change in the nonretentive memory ring 23 of sufficient amplitude to saturate only the minimum cross sectional region thereof, but must have an amplitude less than that required to induce a flux change in the retentive memory ring 22.

Since eddy currents in the nonretentive memory ring 23 are maintained at a minimum because of the material used therein, the flux change induced in the nonretentive memory ring 23 during read out is not significantly affected by the eddy current losses.

As set forth above, a flux proportional to the state of magnetization of the retentive memory ring 22 is forced into the nonretentive memory ring 23, and the flux forced therein and the induced flux concentrate in the minimum cross sectional region thereof. When the read out current pulse 31 is applied to the input winding 24, a flux change is induced in the minimum cross sectional region of the nonretentive memory ring 23 which causes the minimum cross sectional region to be saturated and induces a current pulse in the output winding 25.

The flux change induced in the nonretentive memory ring 23 is equal to the difference between the amount of flux required to saturate the minimum cross sectional region thereof and the amount of residual flux present in the minimum cross sectional region thereof. Therefore, the current pulse induced in the output winding 25 is a function of the flux forced into the nonretentive memory ring 23 from the retentive memory ring 22 and is representative of the stored data signal since the flux forced into the nonretentive memory ring 23 is proportional to the state of magnetization of the retentive memory ring 22.

The read out current pulse 31 may be directed either to oppose the residual flux present in the nonretentive memory ring 23 or to add to the residual flux. When the read out current pulse 31 is directed to add to the residual flux, the output current pulse is an inverse function of the residual flux and, when the read out current pulse is directed to oppose the residual flux, the output current pulse is a direct function of the residual flux.

*Third Embodiment of the Memory Element*

The memory element 41 in FIGS. 3 and 4 consists of an outer memory ring 42, which has a nonmagnetic conductor 46 surrounding its outer surface, and an inner memory ring 43 and has input and output windings 44 and 45 wound about the memory rings.

The outer memory ring 42 has an eccentric aperture formed therein so that a maximum cross sectional region and a minimum cross sectional region are provided and is composed of a retentive, "hard" magnetic material such as iron oxide, Remalloy, or Alnico so that a data signal may be stored therein.

The inner memory ring 43 conforms in shape to the aperture formed in the outer memory ring 42 and is positioned within the aperture of the outer memory ring 42. Also, the inner memory ring 43 has an eccentric aperture formed therein so that a maximum cross sectional region and a minimum cross sectional region are provided and is composed of a nonretentive, "soft" magnetic material such as soft iron. With soft iron, eddy current losses in the nonretentive ring are maintained at a minimum.

The memory rings 42 and 43 are so designed and arranged that the circular aperture of the nonretentive, inner ring 43 is eccentric with respect to the retentive, outer ring 42, though the memory rings 42 and 43 may be arranged so that a concentric relationship is provided. The memory element 41 will also meet the prescribed requirements if the retentive memory ring 42 is designed to be the inner ring, provided the nonmagnetic conductor 46 surrounds the outer surface thereof.

The conductor 46 is provided to negate the effect, for a relatively short period of time, of a flux change induced in the retentive memory ring 42 and is composed of a good conducting material such as copper. As a flux change is induced in the retentive memory ring 42, eddy currents are induced in the conductor 46 in a direction so that they oppose the flux change in the retentive memory ring. As a result, a time lag is provided in the inducing of a resultant flux change in the retentive memory ring 42. When a flux change is induced in the retentive memory ring 42 which has a relatively short pulsing period, the effect thereof is negated by the eddy currents in the conductor 46 and there is no resultant flux change in the retentive memory ring 42. When a flux change is induced in the retentive memory ring 42 which has a relatively long pulsing period, a resultant flux change is induced in the retentive memory ring since the eddy currents induced in the conductor 46 are effective only for a relatively short period of time.

When the retentive memory ring 42 attains a state of magnetization, the flux present therein flows through a continuous closed path. As flux flowing therein approaches the minimum cross sectional region, some flux leaves the retentive memory ring 42 and flows through a portion of the nonretentive memory ring 43 since the nonretentive memory ring 43 provides a less reluctive flux path. In essence, the flux flowing through the nonretentive memory ring 43 is forced out of the retentive memory ring 42. The flux forced out of the retentive memory ring 42 flows through the nonretentive memory ring rather than the surrounding air since the flux path therethrough is less reluctive than the surrounding air, and the amount of flux forced into the nonretentive memory ring 43 is proportional to the state of magnetization of the retentive memory ring 42. Additional flux is induced in the nonretentive memory ring 43 by the flux flowing therethrough, which acts as a magnetizing force, so that a "spreading" of magnetism is provided.

The flux forced into the nonretentive memory ring 43 and the induced flux concentrate in the minimum cross sectional region thereof and the amount of flux present therein remains constant, as long as the retentive memory ring 42 is maintained at the same state of magnetization, so that in essence the flux is residual flux.

The state of magnetization of the retentive memory ring 42 may be altered by applying a new current pulse, having a relatively long pulsing period, to the input winding 44 and a stored data signal may be erased by applying a decaying amplitude A.C. signal to the input winding 44.

Figure 6:
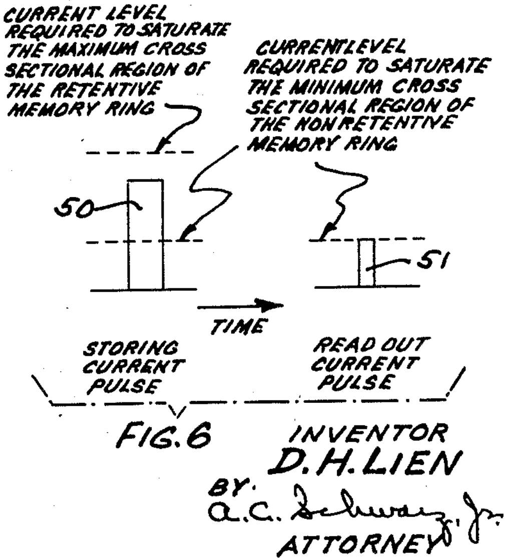
FIG. 6 illustrates typical inputs to be applied to the input winding of the memory element illustrated in FIG. 3 for storing and reading out data signals.

In order to store a data signal in the memory element 41 illustrated in FIGS. 3 and 4 or to read out a data signal therefrom, current pulses similar to the pulses illustrated in FIG. 6 are applied to the input winding 44.

The storing current pulse 50 (FIG. 6) must have an amplitude greater than that required to induce a flux change in the nonretentive memory ring 43 of sufficient amplitude to saturate the minimum cross sectional region thereof so that a flux change is induced in the retentive memory ring 42, but must have an amplitude less than that required to induce a flux change in the retentive memory ring 42 of sufficient amplitude to saturate the maximum cross sectional region thereof. Also, the storing current pulse 50 must have a relatively long pulsing period so that eddy currents induced in the conductor 46 are rendered ineffective and a resultant flux change may be induced in the retentive memory ring 42.

Thus a data signal is stored by applying a current pulse 50, representative of the data signal, to the input winding 44 which has an amplitude that falls within predetermined limits and has a relatively long pulsing period so that the retentive memory ring 42 is driven to a state of magnetization representative of the data signal. A flux change is also induced in the nonretentive memory ring 43 when the storing current pulse 50 is applied to the input winding 44, but the flux change induced therein has no permanent effect thereon because of the nonretentive characteristics thereof.

The read out current pulse 51 (FIG. 6) must have sufficient amplitude to induce a flux change in the nonretentive memory ring 43 which corresponds in amplitude to a flux change required to saturate only the minimum cross sectional region thereof. Also the read out current pulse 51 must have a relatively short pulsing period so that the data signal stored in the retentive memory ring 42 is not altered during read out, since the eddy currents induced in the conductor 46 are effective to negate the effect of a flux change induced in the retentive memory ring 42 for a relatively short period of time.

Since eddy currents in the nonretentive memory ring 43 are maintained at a minimum because of the material used therein, the flux change induced in the nonretentive memory ring 43 during read out is not significantly affected by the eddy current losses.

As set forth above, flux proportional to the state of magnetization of the retentive memory ring 42 is forced into the nonretentive memory ring 43, and the flux forced therein and the induced flux concentrate in the minimum cross sectional region thereof. When the read out current pulse 51 is applied to the input winding 44, a flux change is induced in the minimum cross sectional region of the nonretentive memory ring 43 which causes the minimum cross sectional region to be saturated and induces a current pulse in the output winding 45.

The flux change induced in the nonretentive memory ring 43 is equal to the difference between the amount of flux required to saturate the minimum cross sectional region thereof and the amount of residual flux present in the minimum cross sectional region thereof. Therefore, the current pulse induced in the output winding 45 is a function of the flux forced into the nonretentive memory ring 43 from the retentive memory ring 42 and is representative of the stored data signal since the flux forced into the nonretentive memory ring 43 is proportional to the state of magnetization of the retentive memory ring 42.

The read out current pulse 51 may be directed either to oppose the residual flux present in the nonretentive memory ring 43 or to add to the residual flux. When the read out current pulse 51 is directed to add to the residual flux, the output current pulse is an inverse function of the residual flux and, when the read out current pulse is directed to oppose the residual flux, the output current pulse is a direct function of the residual flux.

Thus, it may be seen that new and improved ring-type magnetic memory elements have been provided wherein data signals having varying amplitudes, represented by storing current pulses which have varying amplitudes that fall within prescribed limits, may be stored and from which the data signals may be read out without the stored data signals being altered so that subsequently the stored data signals may be read out again.

It is to be understood that the above-described embodiments are simply illustrative of the application of this invention. Numerous other embodiments may be readily devised by those skilled in the art which will embody the principles of the invention and fall within the spirit and scope thereof.

What is claimed is:

1. A magnetic memory device comprising:

a closed magnetic circuit including a first magnetically retentive ring having a cross-sectional area that varies from a minimum at a first point to a maximum at a second point diametrically opposed to said first point, and second non-magnetically retentive ring positioned within said first ring and having a cross-sectional area that varies from a minimum at said first point to a maximum at said second point, said first magnetically retentive ring being composed of a material having a low reluctance and a high permeability, said second non-magnetically retentive ring being composed of a material having a high reluctance and high coercive force, first coil means inductively coupled to said magnetic circuit for applying a predetermined intensity pulse to magnetically saturate the first ring at a cross-sectional area removed from said first point whereby the residual flux following termination of said pulse flows partially through said minimum cross-sectional area of said second non-magnetically retentive ring, and second coil means inductively coupled to said magnetic circuit for picking up an output pulse in response to the application of a read out pulse to said first coil means which is of an intensity less than said predetermined intensity.

2. A magnetic memory device comprising:

a ring of highly retentive magnetic material capable of retaining a residual flux of a prescribed magnitude, said ring having a portion of its length of sufficiently small cross-section that it is saturated by residual flux of said prescribed magnitude;

a non-retentive magnetic element arranged closely adjacent said portion of said ring such that a portion of said residual flux may pass therethrough;

first coil means magnetically linked with said non-retentive element for inducing a flux pulse therein of sufficient magnitude to saturate said non-retentive element adjacent said portion of said ring; and second coil means magnetically linked with said non-retentive element for detecting the magnitude of momentary flux change induced therein by said first coil means, said momentary flux chang being a function of the quantity of residual flux carried by said non-retentive member.

3. A magnetic memory device as specified in claim 2, wherein said non-retentive element is in the form of a continuous ring.

4. A magnetic memory device as specified in claim 2, wherein said non-retentive element is in the form of a continuous ring, and wherein that portion of the non-retentive element which is adjacent said portion of said ring of highly retentive material is of smaller cross section than other portions of said non-retentive element.

References Cited in the file of this patent

UNITED STATES PATENTS

| | | |
|---|---|---|
| 2,886,790 | Snyder | May 12, 1959 |
| 2,967,294 | Moerman | Jan. 3, 1961 |
| 2,969,523 | Kelley | Jan. 24, 1961 |